April 15, 1958 P. N. YOUTZ 2,830,714

MULTI-STORY GARAGE FOR STORING AUTOMOBILES

Filed April 6, 1954 8 Sheets-Sheet 1

INVENTOR
PHILIP N. YOUTZ
BY Louis C. Smith
ATTORNEY

April 15, 1958 P. N. YOUTZ 2,830,714

MULTI-STORY GARAGE FOR STORING AUTOMOBILES

Filed April 6, 1954 8 Sheets-Sheet 2

INVENTOR
PHILIP N. YOUTZ

BY

Louis C. Smith
ATTORNEY

April 15, 1958 P. N. YOUTZ 2,830,714

MULTI-STORY GARAGE FOR STORING AUTOMOBILES

Filed April 6, 1954 8 Sheets-Sheet 3

INVENTOR
PHILIP N. YOUTZ
BY Louis C. Smith
ATTORNEY

MULTI-STORY GARAGE FOR STORING AUTOMOBILES

INVENTOR
PHILIP N. YOUTZ

BY Louis C. Smith
ATTORNEY

April 15, 1958 P. N. YOUTZ 2,830,714

MULTI-STORY GARAGE FOR STORING AUTOMOBILES

Filed April 6, 1954 8 Sheets-Sheet 5

INVENTOR
PHILIP N. YOUTZ
BY Louis C Smith
ATTORNEY

INVENTOR
PHILIP N. YOUTZ
BY
Louis C. Smith
ATTORNEY

INVENTOR
PHILIP N. YOUTZ
BY Louis C. Smith
ATTORNEY

April 15, 1958 P. N. YOUTZ 2,830,714

MULTI-STORY GARAGE FOR STORING AUTOMOBILES

Filed April 6, 1954 8 Sheets-Sheet 8

INVENTOR.
PHILIP N. YOUTZ
BY
Louis C. Smith
ATTORNEY

United States Patent Office 2,830,714

Patented Apr. 15, 1958

2,830,714

MULTI-STORY GARAGE FOR STORING AUTOMOBILES

Philip N. Youtz, Yorktown Heights, N. Y.

Application April 6, 1954, Serial No. 421,277

3 Claims. (Cl. 214—16.1)

This invention relates to a garage for storing automobiles.

Multi-story garages are now commonly made either with elevators for transporting the automobiles from the lower floor to various upper floors and returning said automobiles from upper floors to the lower floor, or with ramps running from one floor to another up which automobiles can be driven from the lower floor to any upper floor and can also be driven down from any upper floor to the lower floor.

In garages of this type it is not possible to use the entire area of each upper floor for storing purposes, because it is necessary to have on each floor an aisle extending from the elevator or the top of the ramp of various sections of said floor so that an automobile coming off from the elevator will have a free runway to be driven to the selected part of the upper floor where it is to be stored and an automobile in storage will have a free runway to be driven from its stored position to the elevator or ramp.

It is one of the objects of the present invention to provide a novel garage for storing automobiles in which the entire space above the ground floor will be available for storing the automobiles.

In order to obtain this object I have provided one or more storage units, each of which has a plurality of carriers, each carrier being constructed to receive an automobile, and these carriers are supported in two vertical lines with the carriers in each line spaced from each other. The verticle lines extend from the floor of the building to the top thereof, and the number of carriers in each line will, of course, depend upon the height of the building.

The carriers in each line are connected together, and means are provided for moving the carriers in the two lines simultaneously with the carriers in one line moving upwardly and those in the other line moving downwardly.

At the top of the upwardly moving line of carriers there is transfer means constructed to transfer the top carrier of the upwardly moving line transversely to the top of the downwardly moving line, and at the bottom of the lines there is also a transfer mechanism constructed to transfer the bottom carrier in the downwardly moving line transversely to the bottom of the upwardly moving line.

There is also provided a loading and unloading platform which preferably is situated at ground level and which is located adjacent the path of movement of the chain of carriers.

When an automobile arrives at the garage to be stored, it is driven onto the platform and the chain of carriers is moved so as to bring an empty carrier into register with the platform. The automobile is then driven onto said carrier. If a second automobile arrives to be stored, it is also driven onto the platform and the chain of carriers is moved to bring another empty carrier into register with the loading platform, after which the second automobile can be driven onto said empty carrier. This operation will be repeated as subsequent automobiles arrive at the garage to be stored.

Whenever an automobile which is stored on any one of the carriers is called for, then the chain of carriers is moved so as to bring the carrier having the called for automobile into register with the platform, and such automobile is then driven off from the carrier onto the platform and from thence onto the street.

The carriers may be provided with side walls and a top, thereby forming compartments to receive the automobiles, and one of the end walls of each carrier may be in the form of a door which can be opened to admit the automobile into the carrier, and which when closed may be locked so that each stored automobile occupies a locked compartment.

The above description applies to one storage unit, but it is contemplated that in a large garage there will be a plurality of similar storage units, each capable of independent operation, and these storage units will be arranged side by side, and the loading platform will be of a length to cooperate with all of the storage units.

In the drawings wherein I have illustrated some selected embodiments of the invention:

Figure 1:
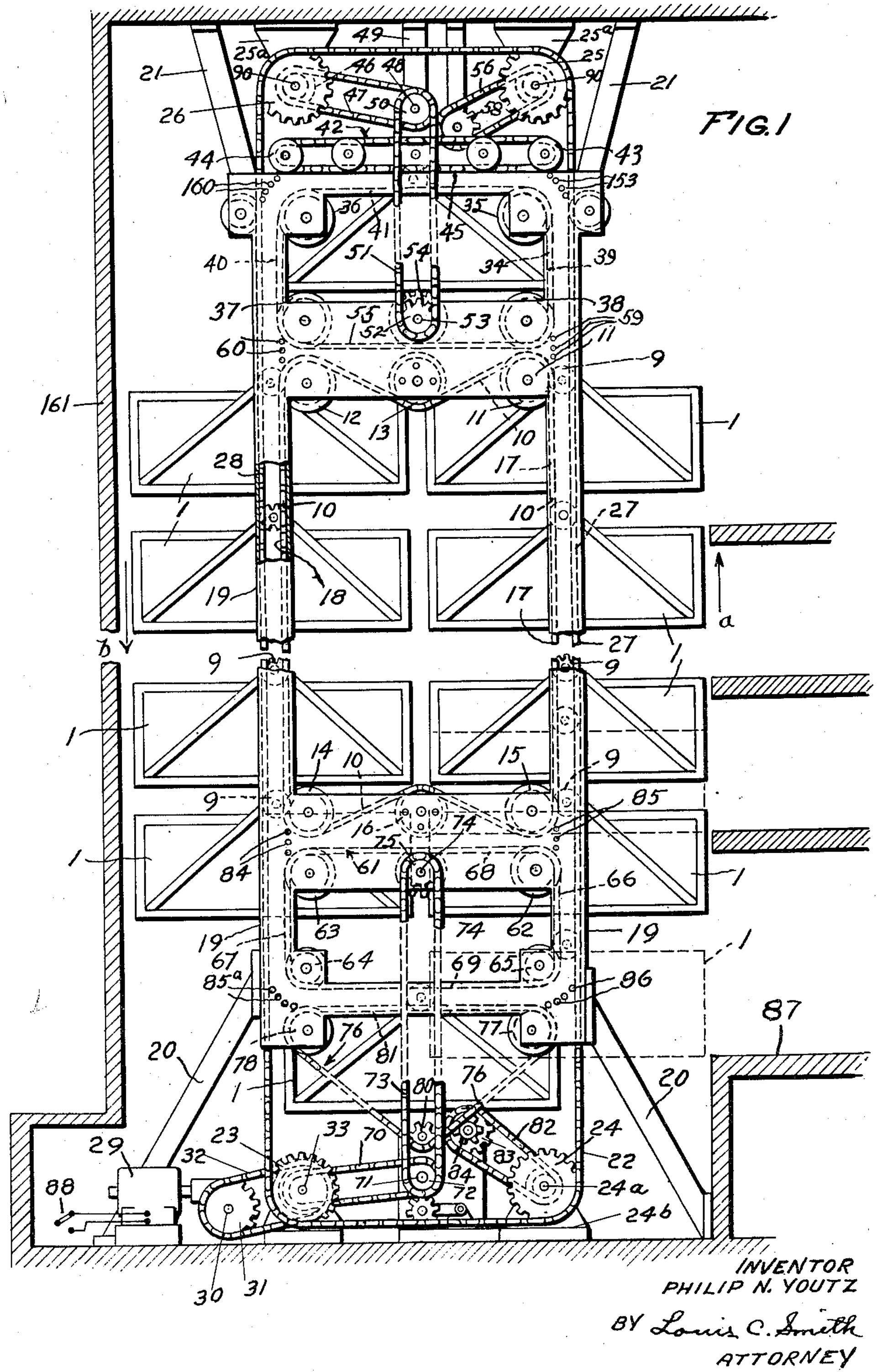
Fig. 1 is a view illustrating one storage unit in side elevation with the walls and ceiling and roof of the building shown in section.

Referring to Fig. 1, the individual carriers, each of which is constructed to receive an automobile, are indicated at 1, and, as stated above, these are arranged in two vertical lines indicated at *a* and *b* with the carriers in each line arranged in spaced-apart relation, one above the other. In Fig. 1 the line *a* may be considered as the upwardly moving line, and the line *b* the downwardly moving line. The carriers in both lines are connected together so that they move in unison with the carriers in line *a* moving upwardly and those in line *b* moving downwardly.

Figure 3:
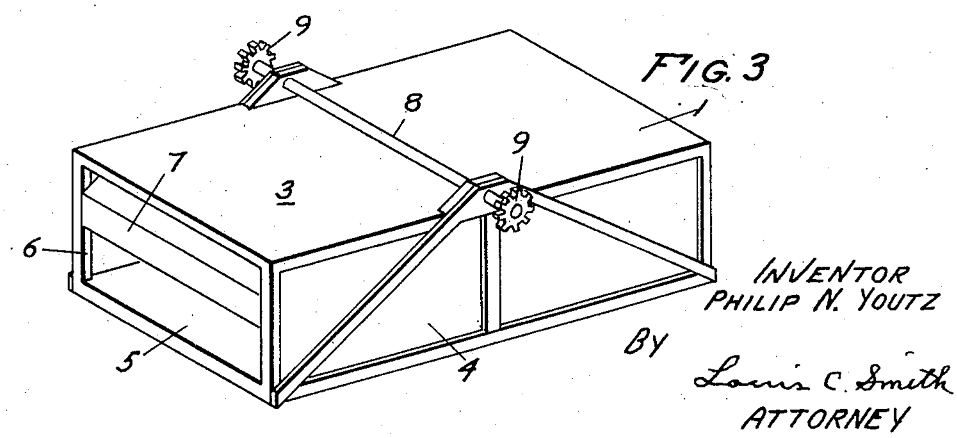
Fig. 3 is a perspective view of one of the carriers.

Each carrier may have the construction shown in Fig. 3, it being a box-like element having the top 3, sides 4, and bottom 5, and being open at one end, as shown at 6, said open end being provided with an overhead door 7 by which the said open end can be closed or opened. In Fig. 3 the door is shown as partially open, and if desired any suitable lock may be employed to lock the door closed after an automobile has been driven into the carrier.

Each carrier is provided with a transversely extending shaft 8 which is situated midway of the length of the carrier and which has mounted thereon at each end a freely rotatable sprocket wheel 9. The carriers are supported one above the other by means of two sprocket chain elements, one of which is stationary and the other of which is movable.

Referring to Fig. 1, the stationary sprocket chain element is indicated at 10, and it passes around direction rollers 11, 12 at its upper end and underneath a stationary sprocket member 13, the teeth of which mesh with the sprocket chain. At the lower end said sprocket chain 10 passes around two roller elements 14, 15 and over stationary sprocket wheel 16, the teeth of which mesh with the said chain. With this arrangement the stationary sprocket chain presents two vertical stretches 17 and 18 which are held stationary by reason of the fact that the upper and lower ends of said sprocket chain have engagement with the stationary sprockets 13 and 16. Stationary sprockets 13 and 16 as well as the guide rollers 11, 12, 14, 15 are mounted in any suitable framework 19 which may be supported at the bottom by suitable supports 20 and which is connected at the top to the roof 100 by other supporting connecting members 21.

Associated with the stationary sprocket chain 10 is an endless movable sprocket chain 22 which passes at its lower end around sprocket wheels 23, 24 and at its upper end around sprocket wheels 25, 26, said sprocket wheels being mounted in bearing members **25*a*. The movable sprocket chain 22 is thus provided with two straight stretches indicated at 27 and 28, and the two sprocket chains have such a relation to each other that the straight stretch 27 of the movable sprocket chain runs parallel and closely adjacent to the straight stretch 17 of the stationary sprocket chain, while the straight stretch 28 of the movable sprocket chain is situated parallel and closely adjacent to the straight stretch 18** of the stationary sprocket chain.

Each storage unit embodies two sprocket chain arrangements such as above described, one on each side thereof, and the carriers 1 are located between the two sets of sprockets chains. One of the sprocket wheels 9 of each carrier in the upwardly moving line *a* operates between the straight stretch 17 of one of the stationary sprocket chains and the straight stretch 27 of the corresponding movable sprocket chain, while the other sprocket wheel 9 of each carrier in the upwardly moving line operates between the corresponding straight stretches of the other set of sprocket chains located on the opposite side of the carrier.

Similarly, the sprocket wheels of each carrier 1 in the downwardly moving line *b* operate between the straight stretches 18 of the stationary sprocket chains and the straight stretches 28 of the movable sprocket chains.

The weight of each carrier is thus supported by the sprocket wheels thereon, such weight being transferred thereby to the straight stretches of the stationary and movable sprocket chains.

The carriers which are used are so divided between the upwardly moving line and the downwardly moving line that there will be the same number of carriers in each line, and hence the total weight of the carriers in each line is substantially counterbalanced by the total weight of the carriers in the other line.

Each of the two movable chains for any storage unit may be driven in any suitable way. The carrier moving means shown in Fig. 1 includes a motor 29 which is connected by suitable worm drive to a shaft 30 having a sprocket 31 thereon which is connected by a sprocket chain 32 to a sprocket on a shaft 33 that extends transversely of the unit. The shaft 33 has the two sprocket wheels 23 fast thereon, one of which operates each movable sprocket chain 22, so that the rotation which the shaft 33 derives from the motor 29 will operate both the endless movable sprocket chains 22 in unison.

When the two endless sprocket chains 22 for each storage unit are operated so that the right hand straight stretch thereof is moving upwardly and the left hand straight stretch is moving downwardly, the engagement of the straight stretch 27 of each sprocket chain with the corresponding sprocket wheels 9 will cause said wheels to roll over the straight stretches 17 of the stationary sprocket chains 10 and thus each carrier will be moved upwardly at one half the speed of the chain.

Similarly, the downward movement of the straight stretch 28 of the movable chains 22 will cause the sprocket wheels 9 of each carrier in the downwardly moving line to roll downwardly over the straight stretch 18 of the stationary sprocket chains, and the downward movement will be one half the speed of the movable chains.

There is provided an upper transfer means at the upper end of the vertical lines to transfer each carrier from the upwardly moving line *a* to the downwardly moving line *b* when said carrier reaches the top of the line, and there is also provided a similar lower transfer means to transfer each carrier in the downwardly moving line transversely into the upwardly moving line when said carrier reaches the lower end of the downwardly moving line. For this purpose the supporting frame 19 is provided at its upper end with an endless transfer sprocket chain 34 which extends around guide rollers 35, 36, 37, 38, whereby said transfer chain 34 presents two vertical stretches 39, 40 which parallel the upper portion of the vertical stretches 27, 28 of the movable sprocket chain 22, and also presents the upper horizontal carrier-transferring stretch 41. Cooperating with this transfer chain 34 is an auxiliary transfer chain 42 which passes around guide rollers 43, 44 and presents a horizontal stretch 45 which parallels the horizontal stretch 41 of the transfer chain 34. The transfer chain 34 is shown as being driven from the sprocket wheel 26, the latter having rigid therewith a sprocket 46 which is connected by a sprocket chain 47 to a sprocket on a shaft 48 that is mounted in suitable bearings 49, and said shaft 48 has rigid therewith another sprocket 50 which operates a sprocket chain 51 that is connected to a sprocket wheel 52 on a shaft 53, said shaft having another sprocket 54 thereon which meshes with the lower horizontal run 55 of the transfer chain 34.

The upper transfer chain 42 is driven from the sprocket wheel 25, the latter having rigid therewith a sprocket which drives a chain 56 that operates a sprocket wheel which is rigid with a sprocket wheel 58 that meshes with the upper horizontal run of the chain 42.

The driving connection for the chains 34 and 42 is such that the speed of both of the chains is the same as that of the movable chain 22, and when during the upward movement of the carriers in the line *a* the sprocket wheels of any carrier reach the upper end of the straight stretch 17 of the stationary sprocket chain 10, said sprocket wheels will be carried by the upwardly moving stretch 27 of the chain 22 into mesh with stationary teeth 59 carried by the frame 19, and thence into engagement with the upwardly moving stretch 39 of the transfer chain 34. Such sprocket wheel will then be moved upwardly by the upper end of the straight stretch 27 of the movable sprocket chain 22 and the straight stretch 39 of the chain 34 until the sprocket wheels reach the upper end of the stretch 39, at which time they will be engaged by the lower straight stretch 45 of the chain 42 and will be carried between said straight stretch and the upper straight stretch 41 of the chain 34 transversely into a position to be brought into engagement with the downwardly moving stretch 28 of the movable chain 22 and the downwardly moving stretch 40 of the transfer chain 34. As the downwardly moving sprocket wheels 9 reach the lower end of the straight stretch 40 of the transfer chains they pass over stationary teeth 60 carried by the frame 19 and thus into engagement with the straight stretch 18 of the stationary sprocket chain 10 and the downwardly moving straight stretch 28 of the movable sprocket chain 22.

A lower transfer means similar to that above described is employed to transfer each carrier from the bottom of the downwardly moving line *b* to the bottom of the upwardly moving line *a*. The transfer means at the bottom includes an endless transfer chain 61 passing around supporting rollers 62, 63, 64, 65 which are mounted in the frame 19, and thus presents two vertical straight stretches 66, 67 and an upper horizontal stretch 68, and a lower horizontal stretch 69. The transfer chain 61 may be driven in any suitable way and preferably at the same speed as the movable chain 22.

As herein shown, the shaft 33 is connected by a sprocket chain 70 to a shaft 71, and the latter has thereon a sprocket wheel 72 meshing with a sprocket chain 73 which drives a shaft 74 carrying two sprocket wheels 75, one of which meshes with the upper horizontal run 68 of the transfer chain 61 thus operating said transfer chain in a direction so that the lower run 69 thereof is moving from the left to the right in Fig. 1. There is also an auxiliary transfer chain 76 which passes around rollers 77 and 78 and 80 and which presents a horizontal upper run 81 that parallels the lower run 69 of the transfer chain 61. This auxiliary transfer chain is shown as being driven from the sprocket wheel 24 by means of a sprocket chain 82 that passes around a sprocket wheel 83, having rigid therewith a driving sprocket wheel 84 that meshes with the chain 76.

The driving connections for the chains 61 and 76 are such that these chains move at substantially the same speed as the endless chain 22.

When the sprocket wheels 9 of any carrier in the downwardly moving line *b* reach the lower end of the vertical stretch 18 of the stationary chain 10, said sprocket will come into mesh with stationary teeth 84 carried by the framing 19 and thus into engagement with the vertical stretch 67 of the transfer chain 61. When the sprocket wheels in their downward movement come to the end of the vertical stretch 67 of the transfer chain 61 they come into mesh with the horizontal stretch 81 of the auxiliary transfer chain 76, and said sprockets will then be moved transversely to the right by the upper run 81 of the auxiliary transfer chain 76 and the lower horizontal run 69 of the upper transfer chain 61.

The carrier supported from such sprocket wheels will thus be carried transversely to the right from the lower end of the downwardly moving line to the lower end of the upwardly moving line, and when each sprocket wheel arrives at the right hand end of the straight stretch 81 of the sprocket chain 76 it will be engaged by the upwardly moving stretch 27 of the movable sprocket chain 22 and will be moved jointly thereby and by the upwardly moving stretch 66 of the transfer chain 61. When the carrier sprocket wheel 9 reach the upper end of the stretch 66 of the transfer chains they engage stationary teeth 85 carried by the frame 19 and are rolled upwardly thereover by the upwardly moving stretch 27 of the movable sprocket chain 22 into engagement with the stationary sprocket chain 10.

The operation of the movable sprocket chain 22 thus moves the carriers of each storage unit in a continuous circuit including the upwardly moving line, the horizontal transfer movement at the top, then downwardly in the downwardly moving line to the transfer mechanism at the bottom by which the carrier is moved transversely into the upwardly moving line again.

As stated above, there is a loading and unloading platform for each storage unit, and such platform is illustrated in Fig. 1 at 87. This platform may be located at ground floor level and thus be accessible to the street, so that an automobile to be stored in any of the carriers can be driven from the street onto said platform.

The operating mechanism for the movable chain is provided with means to bring it to rest with any selected carrier in register with the platform 87, and as shown in Fig. 1, each carrier will come into such registering position when it has been transferred from the bottom of the downwardly moving line to the bottom of the upwardly moving line, as shown by the carrier illustrated in dotted lines Fig. 1. The motor 29 is controlled by a suitable switch 88 so that the operating mechanism can be brought to rest when any selected carrier has come into register with the platform 87.

As stated above, when any automobile is brought to the garage for storage purposes and has been driven onto the platform 87, the chain of carriers may be actuated to bring an empty carrier into the dotted line position shown in Fig. 1, and when the door of such carrier is opened the automobile can be driven thereinto and, if desired, the door may be shut and locked. When another automobile arrives at the garage to be stored and has been driven onto the platform 87, the carrier system will be again set in operation to bring another empty carrier into the dotted line position, Fig. 1, after which such second automobile may be driven into the empty carrier and locked therein. This is the proceeding which is repeated as other automobiles come to the garage for storage purposes.

When any stored automobile is called for, the operating mechanism will be actuated to bring the carrier containing the desired automobile into the dotted line position in Fig. 1 and in registering relation with the platform 87, at which time the door of such carrier may be unlocked and the automobile may be driven out onto the platform and from the latter to the street.

I have stated above that the transfer sprocket chains 34, 42, 61, 76 are driven from the movable endless sprocket chain 22, and said transfer chains may be moved either at the same speed as the chain 22, or at a different speed therefrom. If the transfer chains are moved at the same speed as the movable sprocket chain 22, then when the sprocket wheels 9 of any carrier in the downwardly moving line reach the lower end of the stationary sprocket chain 10, said sprocket wheels will pass into the pathway between the downwardly moving vertical stretch of the transfer chain 61 and the downwardly moving stretch 28 of the sprocket chain 22, said sprocket wheels 9 meshing with both chains. If the sprocket chain 61 is moving at the same speed as the endless movable sprocket chain 22, then each sprocket wheel 9 of the carrier will be moved in the pathway between the downwardly moving stretches of the sprocket chain 61 and the sprocket chain 22 at the same speed as that of the chains, and when the sprocket wheels 9 of any carrier pass into the horizontally extending pathway between the horizontal stretches 69 and 81 of the transfer sprocket chains 61 and 76, said sprocket wheel 9 will still have the same speed as that of the chains, and so long as the chains are operating, the sprocket wheel will have the same speed as that of the chains during its upward movement between the upwardly moving vertical stretches of the transfer sprocket chain 61 and the movable sprocket chain 22. When, however, the sprocket wheel of any carrier reaches the lower end of the vertical stretch 17 of the stationary sprocket chain 10, from then on said sprocket wheel will roll over the stationary stretch 17 and the said wheel will move at a rate one half of that of the movable chain 22. The carriers will thus have a faster movement from the time that the sprockets thereof engage the transfer chains on the downward movement until such sprocket wheels engage the stationary sprocket chain 10 on the upward movement.

The carriers are so spaced from each other that there will be no interference between successive carriers in transferring from one vertical run to the other.

It is to be noted that when the sprocket wheels 9 of any carrier in the upwardly moving line *a* reach a point at which they are engaged by both the upper end of the straight stretch 28 of the endless chain 22 and the vertical stretch 39 of the transfer chain 34, said sprocket wheels and the carrier supported thereby will travel at an increased speed since both chains are moving, and such increased speed will continue until the carrier has been transferred to the top of the downwardly moving line. Each carrier is thus rapidly transferred from the upwardly moving line to the downwardly moving line and reaches the top of the downwardly moving line, where it is out of the path of the succeeding carrier in the upwardly moving line, in time to prevent any interference between the carriers.

The same operation occurs at the bottom of the downwardly moving line when each carrier is being transferred to the bottom of the upwardly moving line. Since the transfer is effected by the two moving chains 61 and 76, the carrier being transferred travels rapidly enough from one line to the other so that it will not interfere with the final downward movement of the succeeding carriers.

Figures 4, 5, 6:
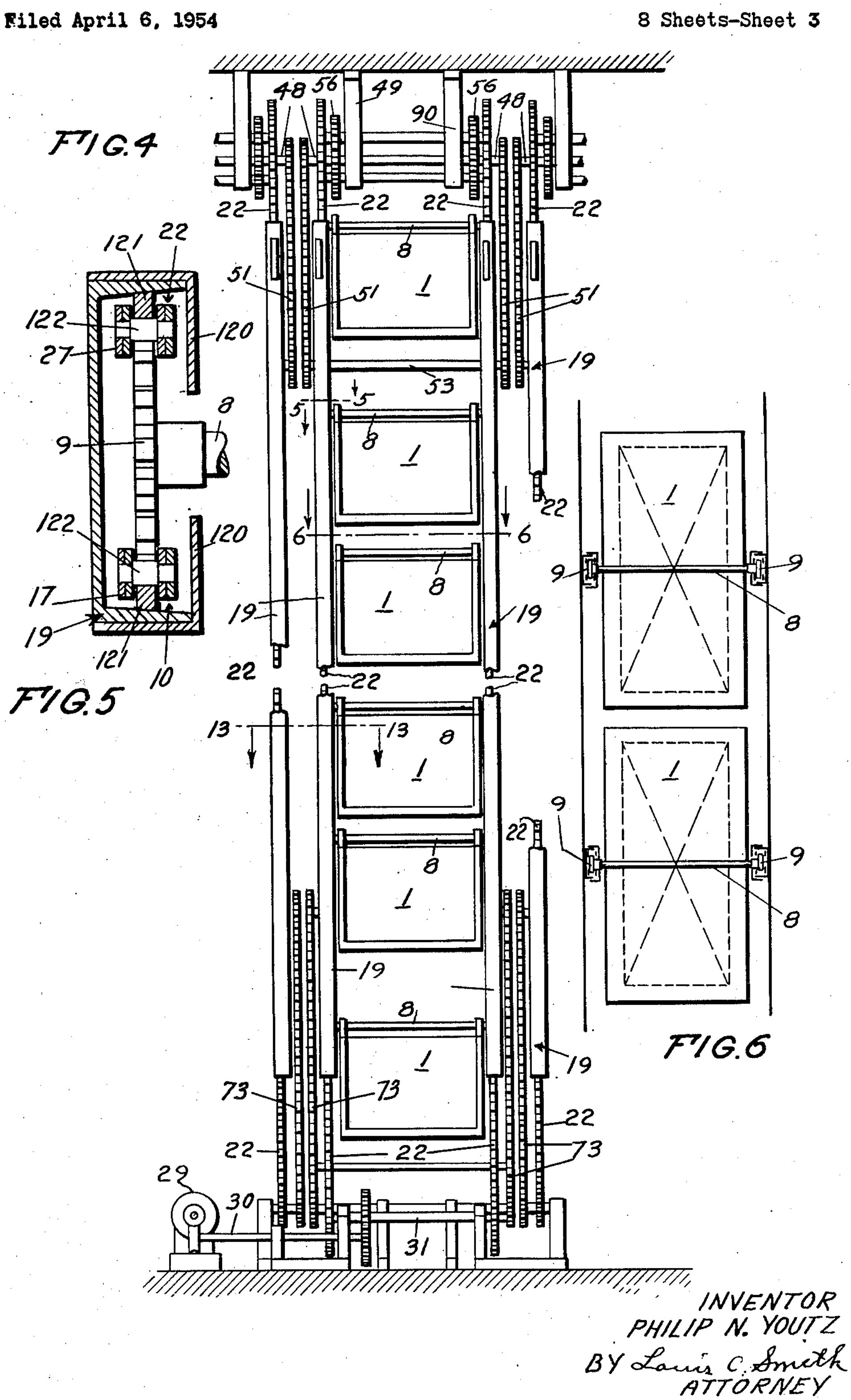
Fig. 4 is a front view of one of the storage units with portions of adjacent storage units.
Fig. 5 is an enlarged horizontal section taken on the line 5—5, Fig. 4.
Fig. 6 is a more or less diagrammatic sectional view through one of the storage units on substantially the line 6—6, Fig. 4.

The frame 19 is constructed so that the parallel straight stretches of the sprocket chains 10 and 22 between which the sprocket wheels 9 of the carriers move are held in proper relation to each other to maintain the sprocket wheels in operative mesh with both sprocket chains during the upward and downward movement of the carriers. As shown in Fig. 5 portions of the frame 19 which enclose the pairs of straight stretches 17, 27 and 18, 28 have a channel shape, and each channel shaped portion is provided with two retaining lips 120 which form with the body of the channel member two passageways in which the straight stretches 17, 27 and 18, 28 are received. The channel member is also provided with guide ribs 121 which engage the rollers 122 of the chains, it being understood that the chains are all of the roller type so that the chains have a rolling contact with the ribs 121. This channel shape of the frame 19 prevents the straight stretches from spreading and maintains them in operative meshing relation to the sprocket wheel 9 which is operating between them.

Figures 12, 13, 14:
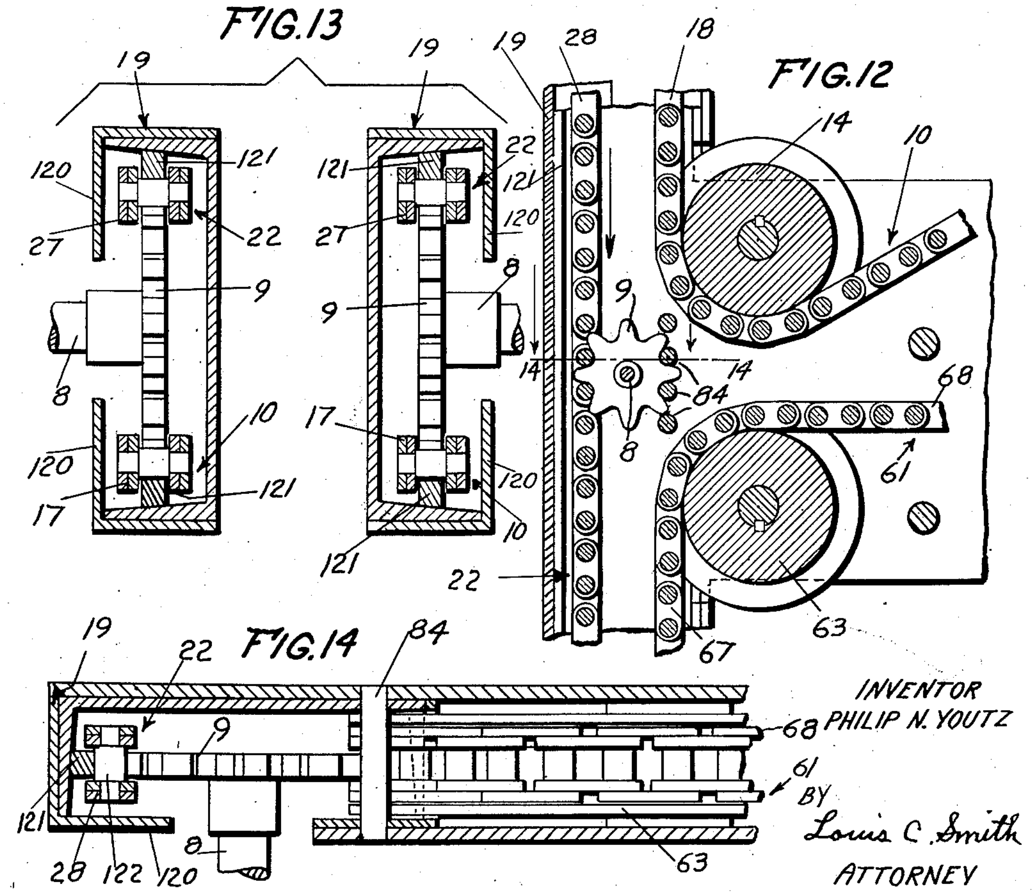
Fig. 12 is a fragmentary sectional view showing the manner of controlling the movement of each carrier at one point in its travelling movement.
Fig. 13 is an enlarged section taken on the line 13—13, Fig. 4.
Fig. 14 is a sectional view taken on the line 14—14, Fig. 12.

I have referred above to the stationary teeth which are carried by the frame 19 to guide the sprocket wheels 9 from the vertical channel or pathway between the straight stretches 17 and 27 into the horizontal transfer passageway between the chains 34 and 42 and also from said transfer passageway into the vertical pathway or passage between the vertical stretch 28 of the movable sprocket chain 22 and the vertical stretch of the transfer chain 34. These stationary teeth may be provided for in any suitable way, but I have shown herein for this purpose a plurality of pins mounted in the frame 19 and extending transversely across the passageway in which the sprocket wheels 9 operate and in position to be engaged by the teeth of said sprocket wheels. This construction is illustrated in Figs. 12 and 14 wherein the said pins are shown at 84 and are properly spaced to mesh with the sprocket wheels 9 of the carriers. Fig. 12 shows the mounting of the pins 84 directly below the lower end of the straight stretch 18 of the stationary sprocket chain 10, and said figure illustrates how a sprocket wheel 9 of a carrier as it is being moved downwardly by the downwardly moving stretch 28 of the sprocket chain 22 will roll off from the lower end of the straight stretch 18 of the stationary sprocket chain 10 and will roll onto and over the pins 84 which function as ratchet teeth. By this means the downwardly moving sprocket wheel is guided from the passage between the lower end of the straight stretch 18 of the stationary sprocket chain into the passage between the downwardly moving portion 67 of the transfer chain 61 and the downwardly moving chain 22.

Figure 19:
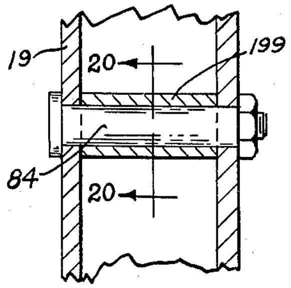
Fig. 19 is a sectional view through one of the so-called rack teeth.
Figure 20:
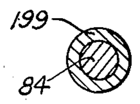
Fig. 20 is a section on the line 20—20, Fig. 19.

In order to reduce friction I may mount sleeves on the pins 84 thereby to provide a rolling contact between the sprocket wheels 9 and said pins. This is shown in Figs. 19 and 20 wherein a sleeve 199 is mounted on each pin 84 to turn freely thereon.

There is a similar set of rack teeth in the form of pins having sleeves mounted thereon shown at 85 to guide the upwardly moving sprocket wheel 9 of each carrier from the passageway between the upwardly moving straight stretch 66 of the transfer chain 61 and the upwardly moving sprocket chain 22 into the passageway between the straight stretch 17 of the stationary chain 10 and the upwardly moving portion of the sprocket chain 22.

There is also a similar group of pins 59 directly above the straight stretch 17 of the stationary sprocket chain by which the upwardly moving sprocket 9 on any carrier is guided into the passageway between the sprocket chain 22 and the vertical stretch 39 of the upper transfer chain 34.

There are also shown a group of similar pins 153 which guide each sprocket wheel 9 of a carrier into the transverse pathway between the transfer chains 34 and 42, and also another group of pins 160 which guide the sprocket wheel 9 of each carrier out from said transverse passageway into the downwardly directed passageway between the straight stretch 28 of the sprocket chain 22 and the vertical stretch 40 of the transfer chain 34.

Another set of these pins shown at 60 serves to guide each sprocket wheel 9 from the transfer chain 34 onto the vertical stretch 18 of the sprocket chain 10.

There are also shown two other groups of similar pins **85*a*, 86 which guide each sprocket wheel 9 of a carrier into the horizontal pathway between the lower transfer chains at the bottom of the downward movement of the carrier and from said transverse pathway into the pathway between the vertical stretch 66 of the transfer chain 61 and the vertical stretch 27 of the movable chain 22**.

Figures 7, 16:
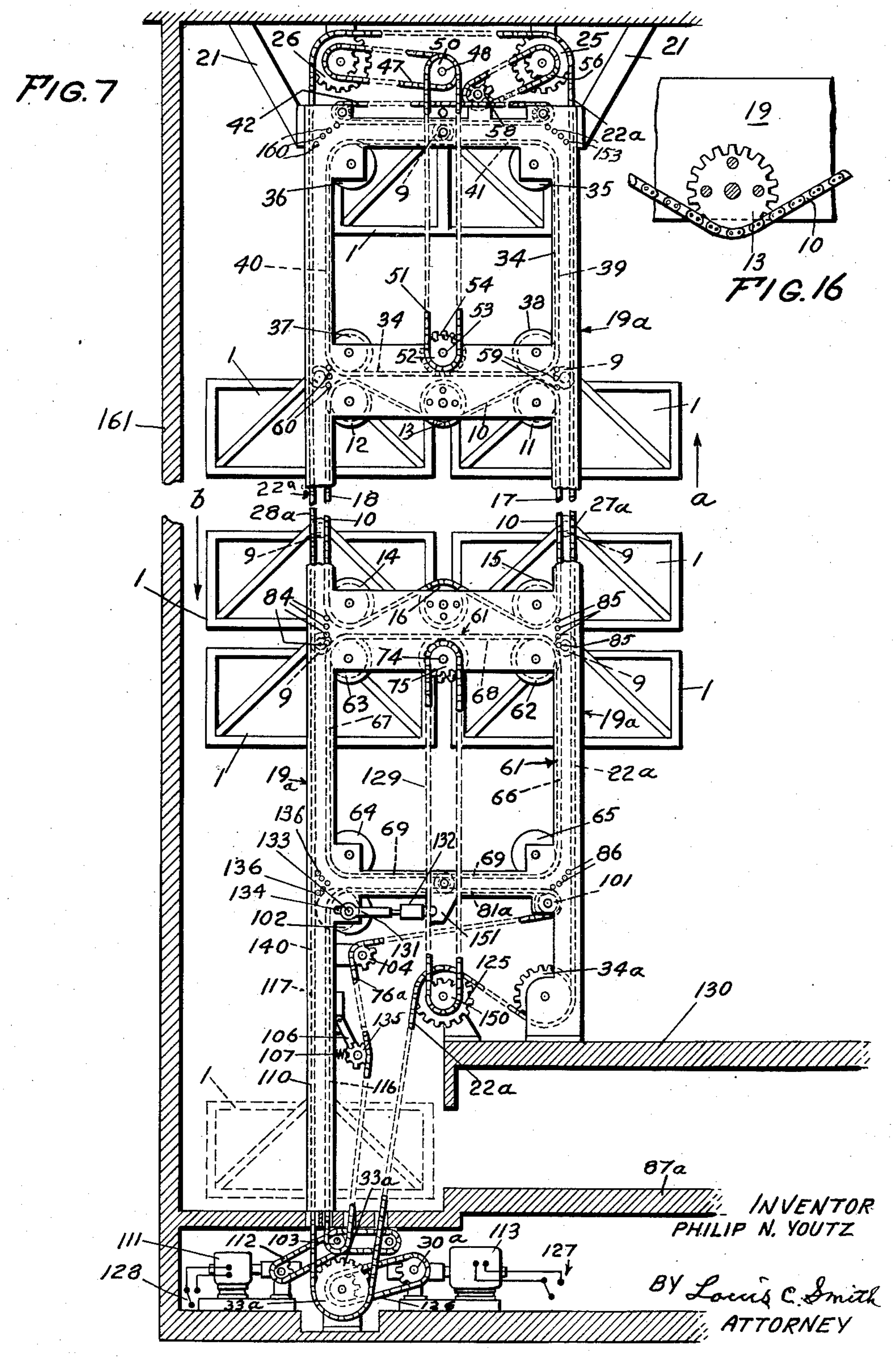
Fig. 7 is a view similar to Fig. 1 but showing a modified form of the invention.
Fig. 16 is a fragmentary view illustrating the manner of anchoring the stationary sprocket chains.

In Fig. 7 I have illustrated a different embodiment of the invention in which the loading and unloading platform or floor is located at a lower level beneath one of the vertically moving lines of carriers, and in which is provided means whereby a carrier moving downwardly may, when it reaches the bottom of the downwardly moving line, be diverted into a downward extension of said line by which the carrier will be taken to the lower level of the loading and unloading platform, in which position an automobile may be loaded into the carrier from the platform, or an automobile discharged from the carrier onto the platform. After the loading or unloading operation has been completed, then the carrier may be moved upwardly in the downward extension to the bottom of the downwardly moving line, and then transferred horizontally to the bottom of the upwardly moving line.

An advantage of this structure is that the entire space in the building above the loading and unloading platform is filled with carriers of the various storage units.

In Fig. 7 the supporting frame which carries the sprocket chains and which corresponds to the frame 19 in Fig. 1 is indicated at **19*a* and it carries the stationary sprocket chain 10, the upper transfer chains 34 and 42, and the lower transfer sprocket chains 61 and 76*a***, which are arranged and operated in the same manner as described with reference to Fig. 1.

In the embodiment shown in Fig. 7, however, the supporting frame 19a is provided at one side with a downwardly directed extension 110 and the endless sprocket chain, which is indicated at 22a in Fig. 7, is carried downwardly through said extension 110 and around a driving sprocket wheel 33a, and thence upwardly over a guiding sprocket wheel 125 and around another sprocket wheel 34a, and thence into the upwardly moving straight stretch 27a.

In this embodiment of Fig. 7 the loading and unloading platform or floor is indicated at 87a, and it is located below the upwardly moving line *a* of carriers. The lower auxiliary transfer chain indicated at 76a passes around the rollers 101 and 102, thereby forming the straight horizontal stretch 81a, and thence downwardly around a driving sprocket wheel 103, and thence upwardly over a guiding sprocket wheel 104 back to the roller 101. The movable sprocket chain 22a is driven by a motor 113 which is connected to the sprocket wheel 33a through suitable reducing gearing and sprocket chain drive 126. The lower auxiliary transfer chain 76a is driven from a separate motor 111 which is connected by reducing gearing and sprocket chain drive 112 to the sprocket 103. Both motors 113 and 111 are preferably reversible motors and each is controlled by a suitable switch, these switches being shown at 127 and 128.

The upper transfer chains 34 and 42 in Fig. 7 are driven from the movable sprocket chain 22a in the same manner as described in Fig. 1, and the lower endless transfer chain 61 is driven from the sprocket wheel 125 by the sprocket chain connection 129, said sprocket wheel 125 being driven by the moving sprocket chain 22a, and having rigid therewith a sprocket wheel 150 which meshes with the sprocket chain 129.

With the arrangement shown in Fig. 7, when the sprocket wheels 9 of any carrier reach the lower end of the downwardly moving stretch of the transfer chain 61, said sprocket wheels may be diverted into the horizontal pathway between the straight stretches 69 and 81a of the transfer chains, or may be diverted into the passageway between the lower end 140 of the downwardly moving vertical stretch of the movable sprocket chain 22a and the vertical stretch 116 of the auxiliary transfer chain 76a, and thus the carrier will be taken to the lower level indicated by the dotted lines, Fig. 7.

If the sprocket wheels 9 of any carrier are to be thus diverted into the downward extension, the motor 113 will be brought to rest when the sprocket wheels reach the entrance of the transverse pathway between the horizontally moving straight stretches 69 and 81a, and the motor 111 will be operated in a direction to cause the vertical straight stretch 116 of the auxiliary sprocket chain 76a to move downwardly. The sprocket wheels 9 of the carrier will then roll downwardly over the then stationary lower portion 140 of the straight stretch 28a of the movable sprocket chain 22a, and when the corresponding carriers reach the dotted line position, Fig. 7, the motor 111 will be stopped. In this position the lowered carrier is registering with the loading and unloading platform or floor 87a so that an automobile can be moved into the carrier 1, if the latter is empty, or if said carrier is full the automobile may be moved out of the carrier onto the platform 87a. In either event, when the loading or unloading has been accomplished the motor 111 will be set in operation again to move the auxiliary transfer chain 76a in a direction so that the vertical stretch 116 thereof will move upwardly, and thereby the carrier in the dotted line position, Fig. 7, will be moved upwardly until the sprocket wheels thereof are brought to the entrance of the horizontal passageway between the straight stretches 69 and 81a. At this time the motor 113 will be started to set the endless carrier chain 22a in operation, which will result in operating the transfer chain 61, and the sprocket wheels of the carrier in question will then be moved transversely between the straight stretches 69 and 81a of the transfer chain to a position over the floor 130 which constitutes the ceiling of the platform 87a, and into position at the bottom of the upwardly moving line *a*.

Figures 8, 9:
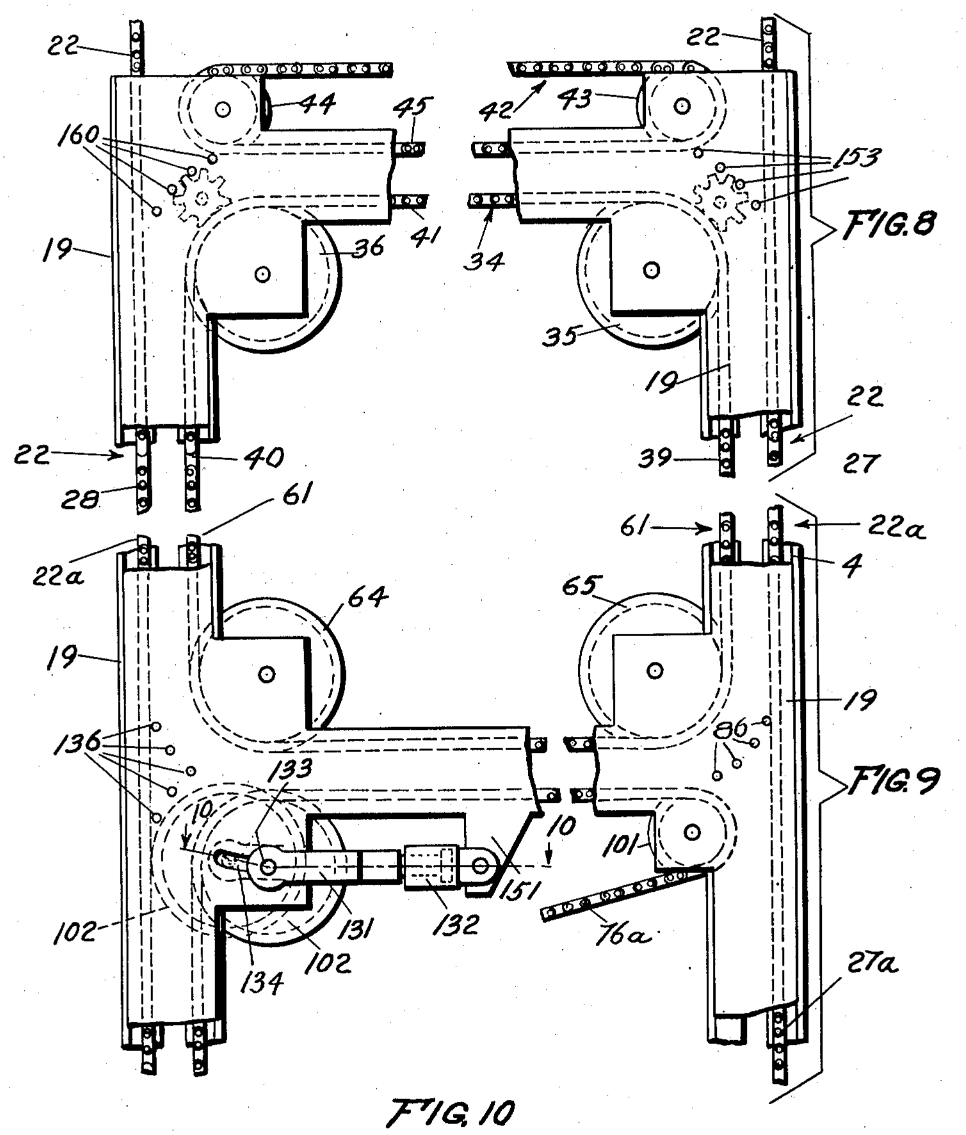
Fig. 8 is an enlarged fragmentary view showing the transfer mechanism at the upper end of the parallel lines.
Fig. 9 is a fragmentary view showing the transfer and switch mechanism used in the construction shown in Fig. 7 at the lower end of the downwardly moving line.
Figure 10:
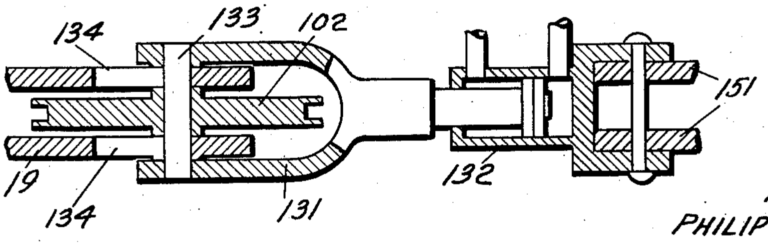
Fig. 10 is a section on the line 10—10, Fig. 9.

For directing the sprocket wheels of any downwardly moving carrier either into the horizontal pathway between the straight stretches 69 and 81a, or into the downwardly directed pathway between the straight stretches 140, 116, I have made each guide roller 102 so that it can be moved either into an open position shown in full lines Fig. 9 in which the passage between the sprocket chain stretches 140 and 116 is open to the horizontal passage between the chain stretches 69 and 81a, or into the dotted line position Fig. 9 when the downwardly directed passage is closed and the only pathway open for the sprocket wheels 9 is into the horizontal pathway.

For this purpose each roller 102 is shown as mounted in a yoke 131 which is connected to a hydraulic jack 132 mounted on the portion 151 of the frame 19a and by which the yoke 131 can be moved horizontally. The roller 102 is mounted on a spindle 133 which operates in a slot 134 formed in the framing 19a, thereby providing for the movement of the roller 102 between its full and dotted line positions Fig. 9.

The auxiliary chain 76a is acted upon by a tensioning sprocket wheel 135 which maintains said sprocket chain 76a under proper tension during the adjusting movement of the roller 102. The tensioning wheel 135 is shown as mounted on a pivoted lever 106 which is acted upon by a spring 107 that applies the proper tension to the sprocket chain 76a.

The framing 19a is provided with suitable stationary gear teeth 136 which guide the sprocket wheels 9 of any carrier into the horizontal pathway or from the latter into the vertical pathway between the straight stretches 140 and 116, and also serve to direct the sprocket wheel 9 of any carrier from the lower passageway between the stretches 140 and 116 into the horizontal pathway as any carrier is raised from its lowered loading and unloading position into the chain of carriers in the upwardly and downwardly moving lines.

Figure 2:
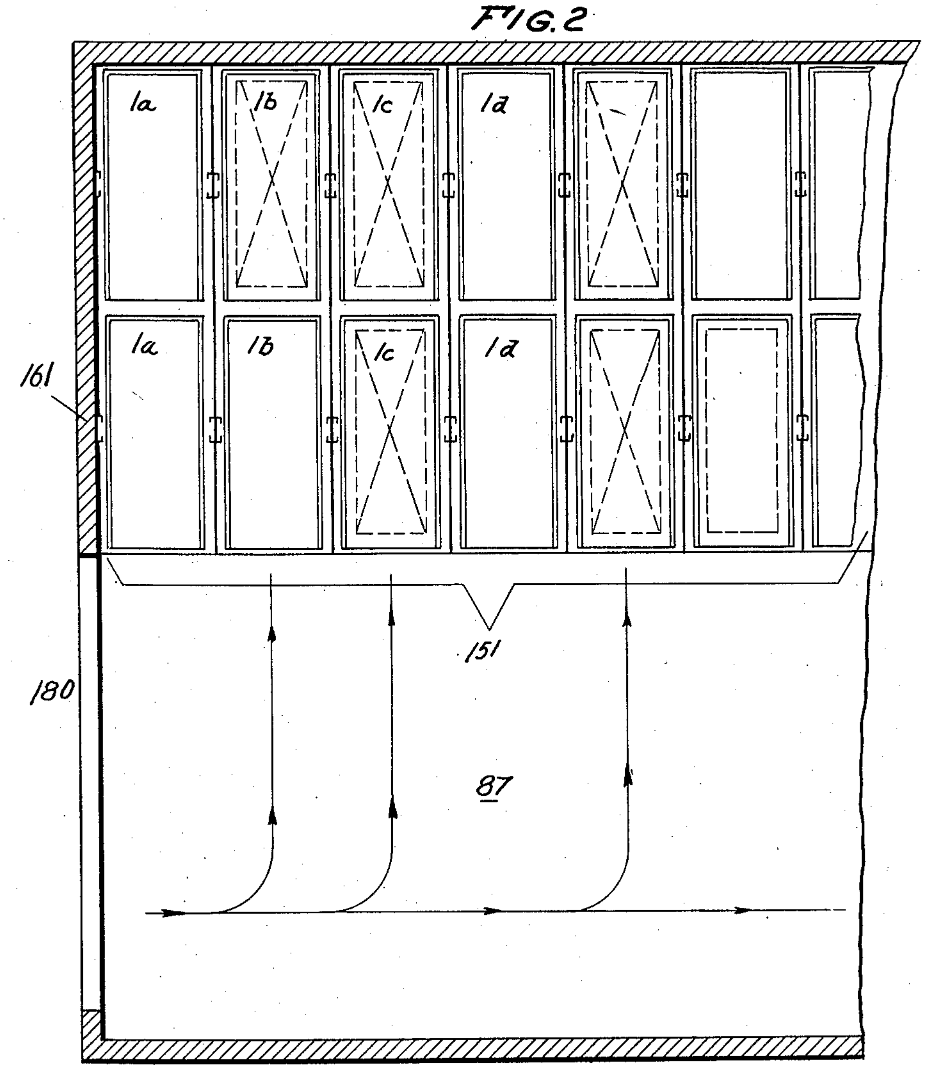
Fig. 2 is a horizontal section through the building illustrating diagrammatically a plurality of storage units arranged side by side, and also illustrating a portion of the loading and unloading platform.

The storage units above described can be arranged within a building in a variety of ways depending upon the shape and size of the building. If the building is a relatively narrow one, then the units may be arranged as shown in Fig. 2 which is a horizontal section, the building being indicated at 161. In this arrangement the individual carriers of one unit are indicated at 1a, 1a, those of the next unit at 1b, 1b, those of another unit at 1c, 1c, et cetera. These storage units are arranged in a row indicated at 151 along one side of the building, and the loading and unloading platform 87 is located along the other side of the building, it being understood that the said platform is readily accessible from the street through the door opening 180. The arrows in Fig. 2 indicate the path which an automobile might take leading to the carrier of any unit which is located in loading or unloading position at the level of the platform 87.

With this arrangement, one side of the building will be filled with the carriers of the various units, while the various floors above the platform 87 will provide additional storage space for automobiles. When such additional space is to be used, the carriers of various units may be used as elevators to take the automobiles from the platform 87 to the desired floor, and as each carrier arrives at the floor the automobile therein can be rolled out of the carrier onto the floor for storage.

Figure 15:
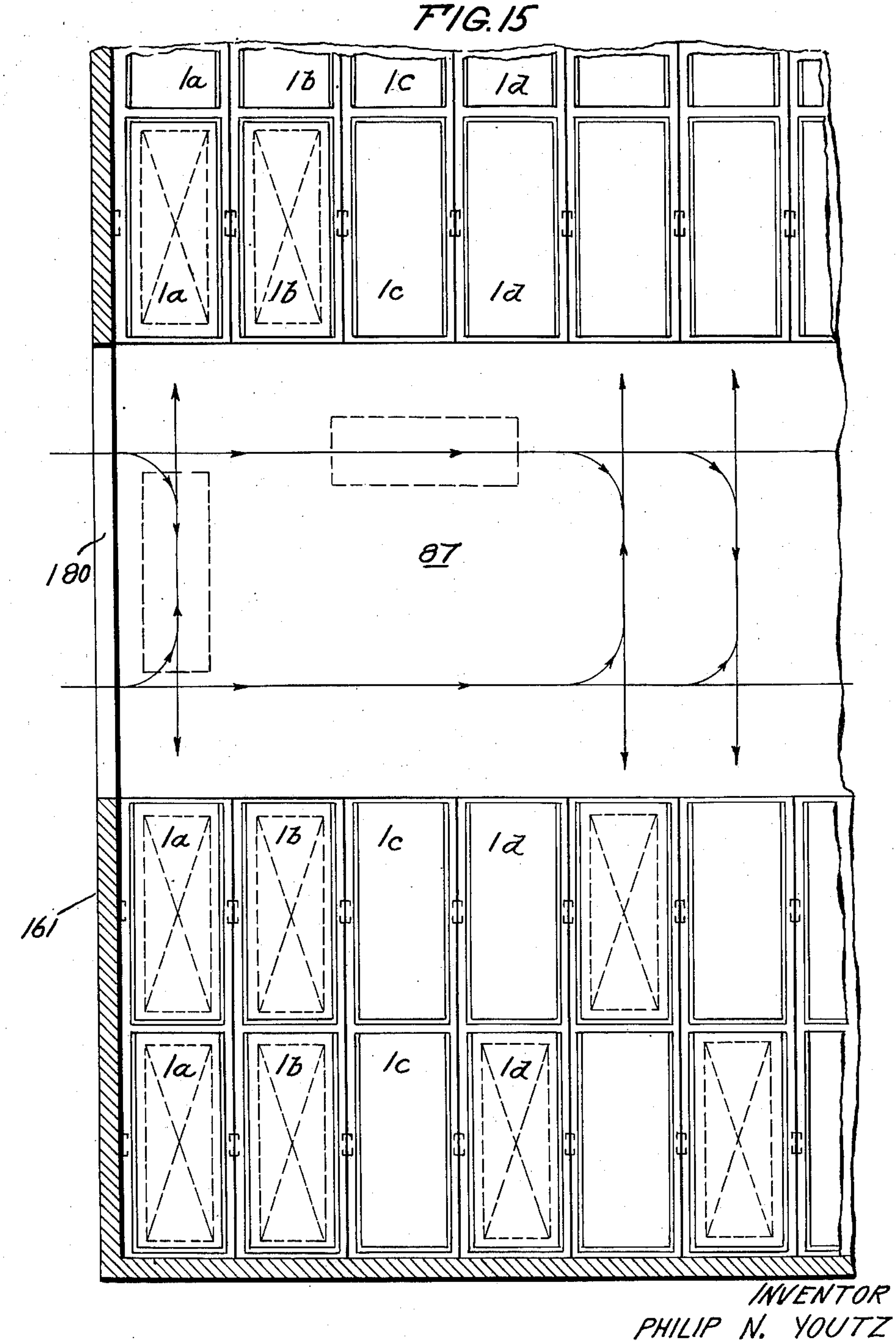
Fig. 15 is a more or less diagrammatic plan view showing an arrangement of storage units different from that shown in Fig. 2.

In Fig. 15 there is shown in plan view another arrangement of units within a building 161, such an arrangement providing a central loading and unloading platform 87 with a bank or row of storage units on each side thereof. In this lay-out the space on the various floors above the platform 87 may be filled with automobiles which are carried to each floor by means of the carriers of various units, and when any carrier arrives at any particular floor, the automobile therein can be rolled out of the carrier onto the floor into a position directly in front of the carrier. If the platform 87 and the floors thereabove have a width equal to the corresponding dimension of each storage unit then the space in the floors above the platform can be filled with two rows of automobiles, and the entire area of all the floors above the platform is then available for storage purposes.

Figure 11:
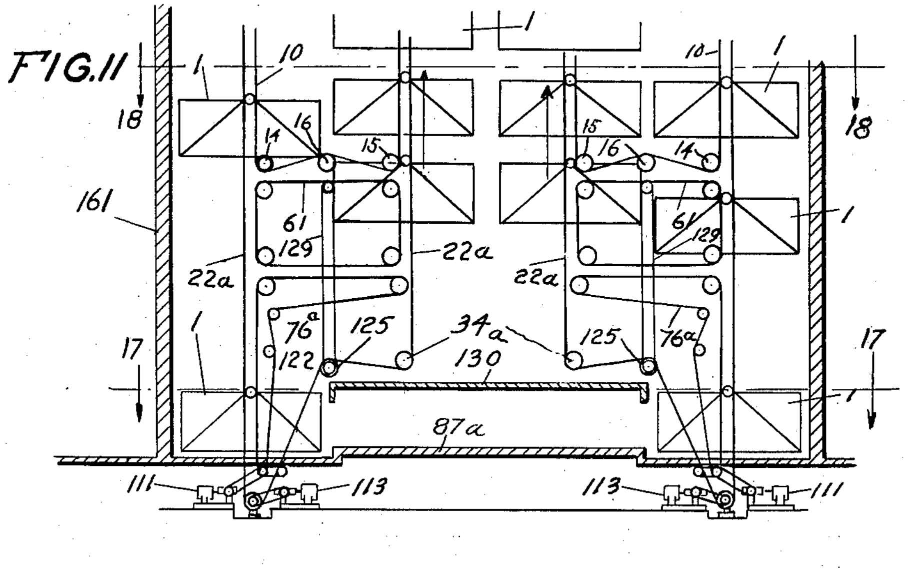
Fig. 11 is a diagrammatic view illustrating a garage arrangement in which two banks of storage units such as shown in Fig. 7 are arranged on either side of a common loading platform or aisle.

The construction shown in Figs. 7 and 11 has the advantage that the entire space within the building above the ceiling 130 over the platform 87*a* is filled with carriers of the various units so that when any automobile has been placed in a carrier it will remain there until it is to be delivered.

As shown in Fig. 11, there are two rows of storage units and the loading and unloading platform 87*a* is situated beneath the upwardly moving line of carriers in both rows.

The loading and unloading of the automobile into and from the carriers is accomplished at each side of the platform, and when any carrier has been loaded it is raised from its lower level into position to be transferred transversely by the lower carrier chains 61 and 76*a* into a position over the ceiling 130.

In the construction shown in Fig. 11 the width of the building 161 is such as to accommodate two rows of storage units, one row along each side of the building with only a minimum working space between the rows. The platform 87*a* is located centrally of the building and is partially beneath one line of carriers in one row and partially beneath one line of carriers in the other row.

Figure 17:
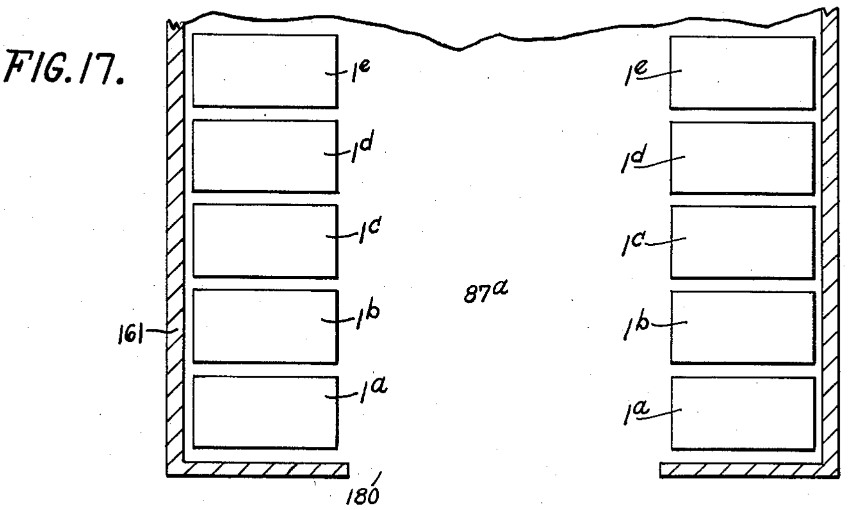
Fig. 17 is a diagrammatic view taken on the line 17—17, Fig. 11.
Figure 18:
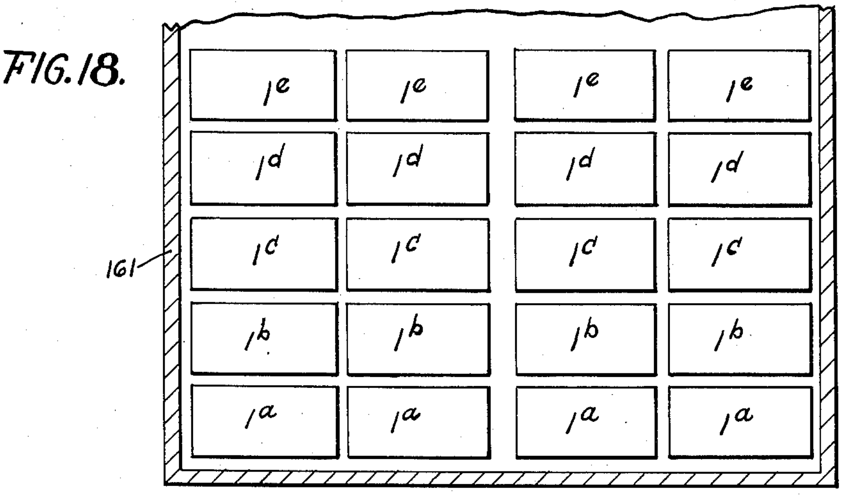
Fig. 18 is a diagrammatic view taken on the line 18—18, Fig. 11.

With this arrangement there will be no floor construction above the ceiling 130 and all of the space above the said ceiling will be filled with carriers. This is illustrated in Figs. 17 and 18, wherein Fig. 17 shows the loading platform 87*a* and the carriers at the lower level, and Fig. 18 shows the distribution of the carriers above the ceiling. Of the carriers illustrated in Fig. 18, those designated 1*e* represent the carriers in one row of storage units and those designated 1*f* represent the carriers in another row of storage units. An advantage of this construction is that the cost of erecting the building is reduced because no upper floors are necessary.

In describing the operation of each storage unit I have referred to one line of carriers as the upwardly moving line and the other line as the downwardly moving line. I wish to have it understood, however, that either line of carriers in any unit may be considered as the upwardly moving line and the other as the downwardly moving line, depending upon which direction the endless moving chain 22 is being operated.

The motor by which said chain is given its movement may be a reversible motor so as to enable the chain 22 or 22*a* of each unit to be moved in either direction.

I claim:

1. An automobile storage unit comprising a plurality of carriers each adapted to receive an automobile and each having a freely rotatable sprocket wheel, carrier-supporting and moving means co-operating with the sprocket wheels of the carriers and supporting said carriers in two vertical lines with the carriers in each line located one above another in spaced apart relation, means for operating the carrier-supporting and moving means to move all the carriers in the two lines in unison with the carriers in one line moving upwardly and those in the other line moving downwardly, an upper transfer means to transfer each carrier when it reaches the top of the upwardly moving line from said line to the top of the downwardly moving line, a lower transfer means to transfer each carrier directly from the bottom of the downwardly moving line to the bottom of the upwardly moving line, a loading and unloading platform located at a lower level below the lower transfer means, said carrier-supporting and moving means including an endless sprocket chain operatively engaging the sprocket wheels of all vertically moving carriers, which chain has an extension portion reaching from the lower transfer means to said platform, means operative at will to divert any carrier from the lower transfer means as said carrier arrives at the bottom of the downwardly moving line, and means operative while said endless sprocket chain and its extension portion are stationary and co-operating with said stationary extension portion and the sprocket wheel of the diverted carrier to move said carrier downwardly to the said platform and then to return said carrier along the same stationary extension portion to the position from which it was diverted.

2. An automobile storage unit comprising a plurality of carriers each adapted to receive an automobile and each having a freely rotatable sprocket wheel, carrier-supporting and moving means co-operating with said sprocket wheels of the carriers and supporting said carriers in two main vertical lines with the carriers in each line located one above another in spaced relation, means for operating said carrier-supporting and moving means to move all the carriers in the two lines in unison with the carriers in one line moving upwardly and those in the other line moving downwardly, said carrier-supporting and moving means including a main movable endless sprocket chain operatively engaging the sprocket wheels of all vertically moving carriers, an upper transfer means to transfer each carrier when it reaches the top of the upwardly moving line from said line to the top of the downwardly moving line, a lower transfer means to transfer each carrier directly from the bottom of the downwardly moving line to the bottom of the upwardly moving line, each of said transfer means comprising a pair of endless transfer sprocket chains, each transfer sprocket chain having a substantially horizontally extending straight stretch which parallels and is spaced from the straight stretch of the other transfer sprocket chain in the respective pair thereby providing a substantially horizontal pathway in which said sprocket wheels on the various carriers may travel from one moving line to the other with each sprocket wheel in mesh with both transfer sprocket chains during such travel, one transfer chain of each pair having two straight stretches of predetermined length extending vertically respectively from and as substantial continuations of the adjacent ends of said two main vertical lines, each of said transfer chain straight stretches being parallel and spaced from a portion of said main endless movable sprocket chain thereby providing two pairs of movable vertical stretches of sprocket chains at each end of said main vertical lines, means for operating both of said transfer chains at substantially the same speed as said main endless movable chain for moving said carriers vertically at each end of said main lines and transversely from one line to the other at substantially twice the speed of carriers with sprocket wheels in said main lines whereby interference between carriers is avoided during transference from one line to the other, a loading and unloading platform located at a lower level below the lower transfer means, said main sprocket chain having an extension portion reaching from said lower transfer means to said platform, means operative at will for stopping said main sprocket chain and for diverting any carrier from said lower transfer means as said carrier arrives at the beginning of said extension portion, and means operative while said main endless sprocket chain and its extension portion are stationary and co-operating with said stationary extension portion and the sprocket wheel of the diverted carrier to move said carrier downwardly to said platform and then to return said carrier to the position from which it was diverted.

3. An automobile storage unit comprising a plurality of carriers each adapted to receive an automobile and each having at its upper portion a freely rotatable supporting and driving sprocket wheel, means for supporting and moving said carriers by said sprocket wheels in two vertical lines with said carriers movable in unison upwardly in one line and downwardly in the other line, said means comprising a stationary sprocket chain having two parallel vertically extending straight stretches and a main endless movable sprocket chain also having two vertically extending straight stretches, each of said movable chain straight stretches paralleling but spaced from a vertical stretch of the stationary sprocket chain thereby providing two pairs of vertical straight stretches each including a stationary sprocket chain section and a movable sprocket chain section, said freely rotatable sprocket wheel on each carrier being adapted to move between and mesh with the stationary and main movable sprocket chain sections of said pairs of straight stretches, means for operating said main endless movable sprocket chain so that it moves upwardly in one of said vertical stretches and correspondingly downwardly in the other of said vertical stretches whereby the sprocket wheels on the carriers in one line roll upwardly over the corresponding stationary sprocket chain and move the respective carriers upwardly while the sprocket wheels on the carriers in the other line roll downwardly over the other stationary sprocket chain vertical stretch and move said latter carriers downwardly, transfer means at each end of said straight stretches of chains for transferring each carrier from the end of one moving line to the corresponding end of the other moving line, each of said transfer means comprising a pair of endless transfer sprocket chains, each transfer chain having a substantially horizontally extending straight stretch which parallels and is spaced from the straight stretch of the other transfer sprocket chain in the respective pair thereby providing a substantially horizontal pathway in which said sprocket wheels on the various carriers may travel from one moving line to the other with each sprocket wheel in mesh with both transfer sprocket chains during such travel, one transfer chain of each pair having two straight stretches of predetermined length extending vertically respectively from and as substantial continuations of the adjacent ends of said two vertically extending straight stretches of said stationary chain, each of said transfer chain vertically extending straight stretches being parallel and spaced from a portion of the vertical stretch of said main endless movable sprocket chain thereby providing two pairs of movable vertical stretches of sprocket chains at each end of said stationary chain, means for operating both of said transfer chains of each transfer means at substantially the same speed as said main endless movable chain for moving said carriers vertically at each end of said stationary chain and transversely from one line to the other at substantially twice the speed of carriers with sprocket wheels in engagement with said stationary chain whereby interference between carriers is avoided during transference from one line to the other, a loading and unloading platform located at a lower level than the lower end of the straight stretches of the transfer chain at the lower end of said stationary chain, said main movable sprocket chain having an extension portion reaching from said latter lower end of said transfer chain substantially to said platform, means operable at will for stopping said main endless chain when a carrier arrives at the bottom of the downwardly moving line and for diverting said carrier from the lower transfer means, and means comprising an extension of one of said chains of said latter transfer means operable while said main endless sprocket chain extension is stationary and co-operating with said stationary extension and the sprocket wheel of the diverted carrier to move said carrier downwardly to the said platform and to return said carrier to the position from which it was diverted.

References Cited in the file of this patent

UNITED STATES PATENTS

| | | |
|---|---|---|
| 561,223 | Hamilton | June 2, 1896 |
| 1,859,483 | Winslow | May 24, 1932 |
| 1,871,372 | James | Aug. 9, 1932 |
| 1,877,293 | Geiger | Sept. 13, 1932 |
| 1,972,258 | Boyle | Sept. 4, 1934 |
| 2,609,112 | McKenzie | Sept. 2, 1952 |
| 2,612,238 | Angelicola | Sept. 30, 1952 |
| 2,645,367 | Stabile | July 14, 1953 |

FOREIGN PATENTS

| | | |
|---|---|---|
| 34,943 | Netherlands | Mar. 15, 1935 |
| 260,397 | Switzerland | July 16, 1949 |
| 464,013 | Great Britain | Apr. 9, 1937 |